(12) United States Patent
    Kumar

(10) Patent No.: US 9,784,465 B2
(45) Date of Patent: Oct. 10, 2017

(54) PORTABLE AIR COOLING SYSTEM AND METHOD

(71) Applicant: Sivathanu B. Kumar, Tampa, FL (US)

(72) Inventor: Sivathanu B. Kumar, Tampa, FL (US)

( * ) Notice: Subject to any disclaimer, the term of this patent is extended or adjusted under 35 U.S.C. 154(b) by 128 days.

(21) Appl. No.: 14/817,274

(22) Filed: Aug. 4, 2015

(65) Prior Publication Data
US 2016/0039269 A1    Feb. 11, 2016

Related U.S. Application Data

(60) Provisional application No. 62/033,598, filed on Aug. 5, 2014.

(51) Int. Cl.
| F25D 17/06 | (2006.01) |
| F24F 11/00 | (2006.01) |
| F24F 5/00 | (2006.01) |
| B60H 1/00 | (2006.01) |
| F24F 1/02 | (2011.01) |

(52) U.S. Cl.
CPC ...... *F24F 11/0079* (2013.01); *B60H 1/00264* (2013.01); *B60H 1/00407* (2013.01); *F24F 1/025* (2013.01); *F24F 5/0017* (2013.01); *Y02E 60/147* (2013.01); *Y02E 70/30* (2013.01)

(58) Field of Classification Search
CPC ........................... F25D 17/065; F25D 2400/04
USPC ............. 62/77, 89, 132, 186, 237, 244
See application file for complete search history.

(56) References Cited

U.S. PATENT DOCUMENTS

| 2011/0253113 A1* | 10/2011 | Roth ............... F02D 41/008 123/568.12 |
| 2012/0297772 A1* | 11/2012 | McBride ............ F01B 23/00 60/649 |
| 2014/0166596 A1* | 6/2014 | Anderson ........... F02M 37/221 210/799 |

* cited by examiner

*Primary Examiner* — Melvin Jones

(57) ABSTRACT

A portable air cooling system and method for providing cooled air for mobile use for a user including in a golf cart has an insulated portable casing, an air cooling assembly, a primary air blower fan, a secondary air blower fan, a computer control unit, switches including variable resistance switches, a portable power source including batteries and solar panels, and a secondary casing for housing the portable power source.

10 Claims, 5 Drawing Sheets

PORTABLE AIR COOLING SYSTEM AND METHOD

RELATED APPLICATION

This application is based upon Provisional Application No. 62/033,598 entitled "Method and System for a Portable Air Cooling System for General Use in Vehicles including Golf Carts" filed Aug. 5, 2014, the subject matter of which application is incorporated herein by reference.

BACKGROUND OF THE INVENTION

Field of the Invention

The present invention relates to a portable air cooling system and method and more particularly pertains to providing cooled air for mobile use for a user including in a golf cart safe, convenient, and economical manner.

Description of the Prior Art

The use of portable air cooling systems of known designs and configurations is known in the prior art. More specifically, portable air cooling systems of known designs and configurations previously devised and utilized for the purpose of providing cool air to a user are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, the aforementioned patents do not describe a portable air cooling system and method that provides portable air cooling generally for mobile use including golf carts in a safe, convenient, and economical manner.

In this respect, the portable air cooling system according to the present invention substantially departs from the conventional concepts and designs of the prior art, and in doing so provides an apparatus primarily developed for the purpose of providing portable air cooling generally for mobile use including golf carts in a safe, convenient, and economical manner.

Therefore, it can be appreciated that there exists a continuing need for a new and improved portable air cooling system and method which can be used for providing cooled air for mobile use for a user including in a golf cart safe, convenient, and economical manner. In this regard, the present invention substantially fulfills this need.

SUMMARY OF THE INVENTION

In view of the foregoing disadvantages inherent in the known types of portable air cooling systems of known designs and configurations now present in the prior art, the present invention provides an improved portable air cooling system and method. As such, the general purpose of the present invention, which will be described subsequently in greater detail, is to provide a new and improved portable air cooling system and method which has all the advantages of the prior art and none of the disadvantages.

To attain this, the present invention essentially comprises a portable air cooling system for providing cooled air for mobile use for a user including in golf cart includes an insulated portable casing, an air cooling assembly, a primary air blower fan, a secondary air blower fan, a computer control unit, switches including variable resistance switches, a portable power source including batteries and solar panels, and a secondary casing for housing the portable power source including batteries.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable air cooling system and method which has all of the advantages of the prior art portable air cooling systems of known designs and configurations and none of the disadvantages.

It is another object of the present invention to provide a new and improved portable air cooling system and method which may be easily and efficiently manufactured and marketed.

It is further object of the present invention to provide a new and improved portable air cooling system and method which is of durable and reliable constructions.

An even further object of the present invention is to provide a new and improved portable air cooling system and method which is susceptible of a low cost of manufacture with regard to both materials and labor, and which accordingly is then susceptible of low prices of sale to the consuming public, thereby making such portable air cooling system and method economically available to the buying public.

Lastly, it is still another object of the present invention is to provide a portable air cooling system and method for providing cooled air for mobile use for a user including in a golf cart safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
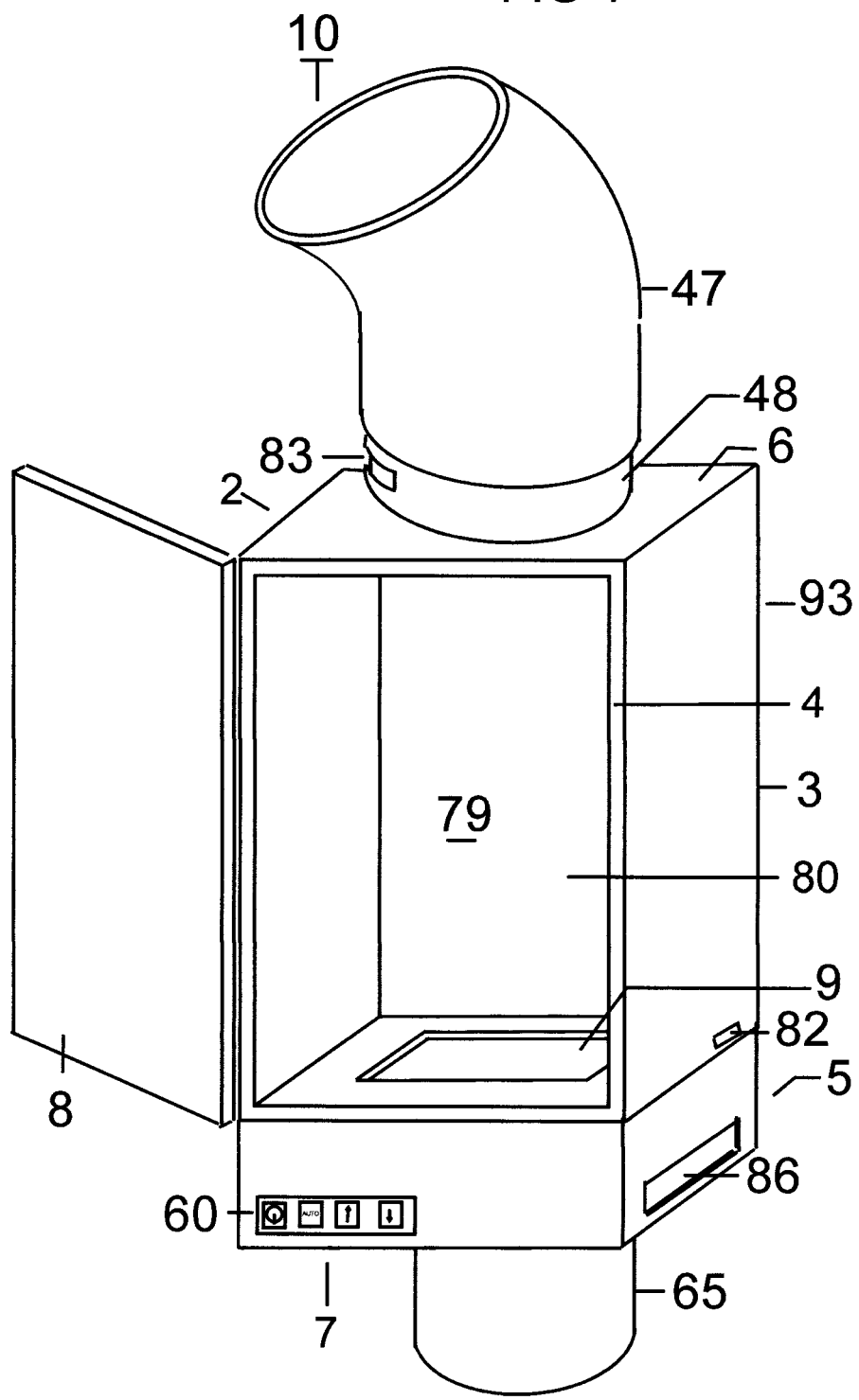
FIG. 1 is a perspective front view of a portable air cooling system constructed in accordance with the principles of the present invention shown without the air cooling assembly.
Figure 2:
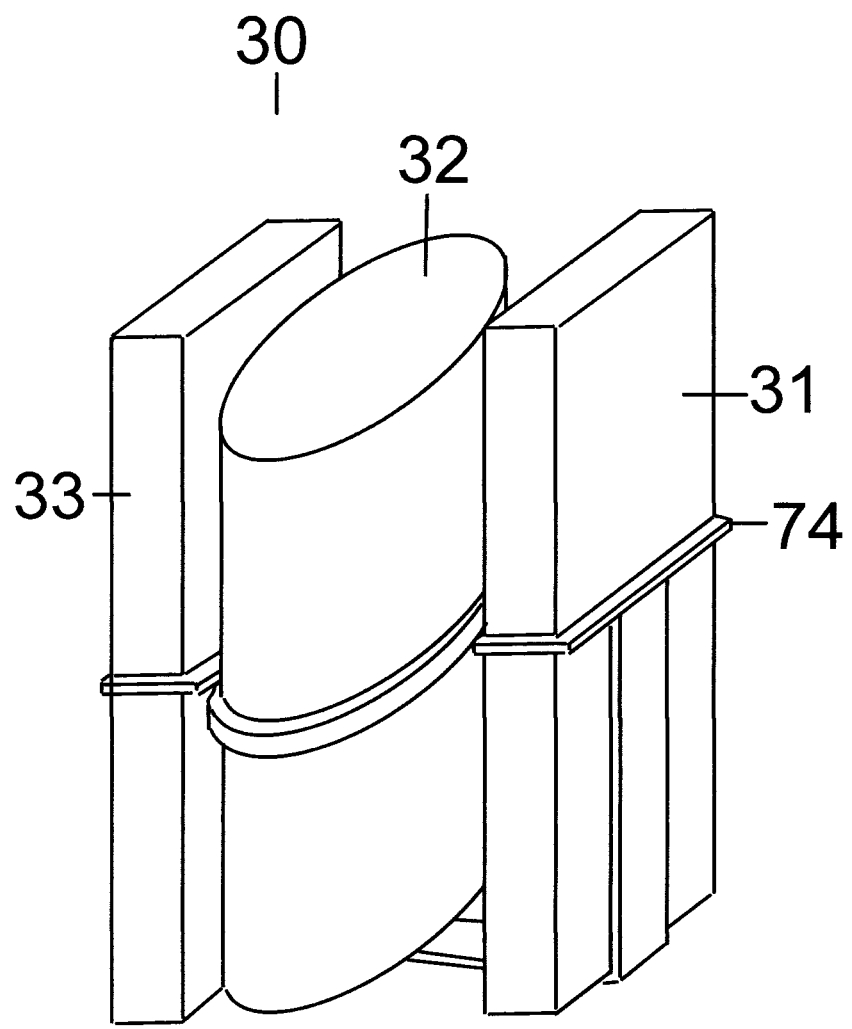
FIG. 2 is a perspective front view of the air cooling assembly illustrating a plurality of shapes and materials of refrigerant packs including rectangular and cylindrical shaped ice pack ans gel packs.
Figure 3:
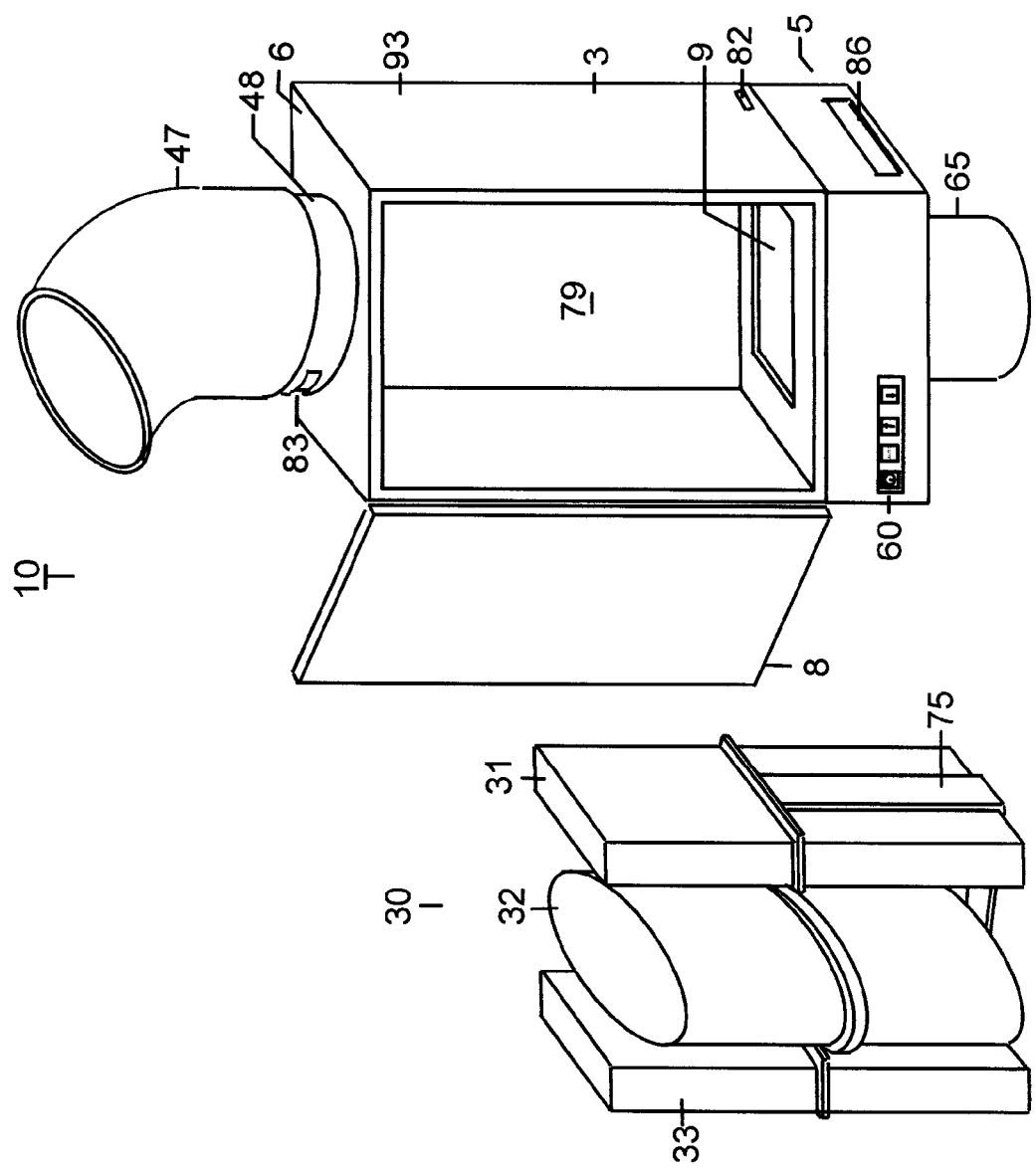
FIG. 3 is a perspective front view of the portable air cooling system constructed in accordance with the principles of the present invention shown including the air cooling assembly.
Figure 4:
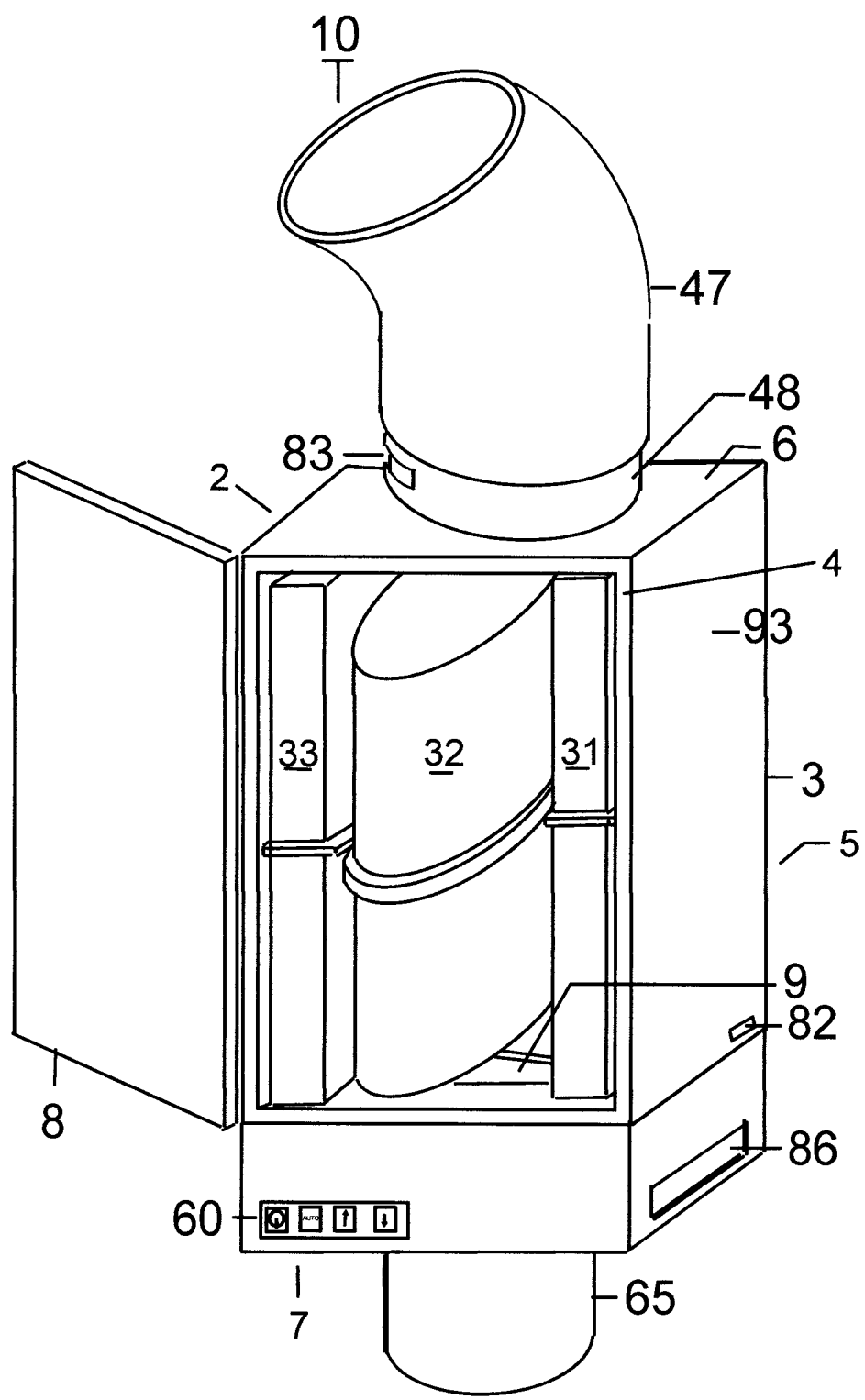
FIG. 4 is a perspective front view of a the portable air cooling system constructed in accordance with the principles of the present invention shown including the air cooling assembly received within the insulated portable casing.
Figure 5:
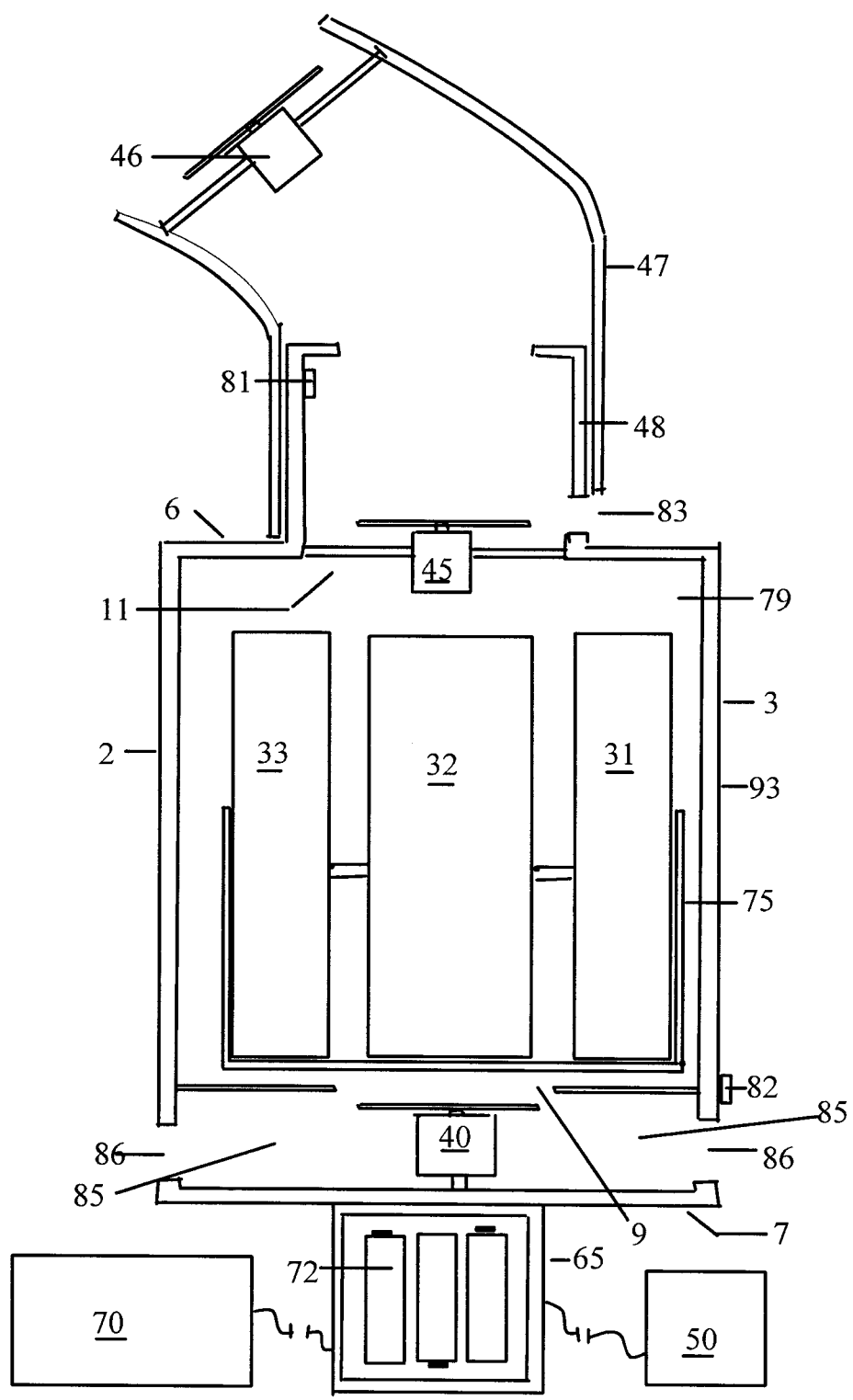
FIG. 5 is a schematic illustration of the portable air cooling system of the present invention.

With reference now to the drawings, and in particular to FIG. 1 thereof, the preferred embodiment of the new and improved portable air cooling system and method embodying the principles and concepts of the present invention and generally designated by the reference numeral 10 will be described.

The present invention, the portable air cooling system and method 10 is comprised of a plurality of components. Such components in their broadest context include a insulated portable casing, an air cooling assembly, a primary air blower fan, a secondary air blower fan, a computer control unit, switches, a portable power source, and a secondary casing. Such components are individually configured and correlated with respect to each other so as to attain the desired objective.

From a specific standpoint in the portable air cooling system of the present invention, first provided are an insulated portable casing 93, an air cooling assembly 30, a primary air blower fan 40, a secondary air blower fan 45, a computer control unit 50, switches 60 including variable resistance switches, a portable power source including batteries and solar panels 70; and a secondary casing 65 for housing the portable power source including batteries.

In the preferred embodiment, the insulated portable casing is a generally box-shaped insulated portable casing 93. The insulated portable casing has insulated left 2, right 3, front 4, and back 5 upstanding sides. The insulated portable casing has a top 6 and a bottom 7. A central opening 79 is provided between the left 2, the right 3, the front 4, and the back 5 upstanding sides and the top 6 and the bottom 7. The front side has an opening 80. An insulated door 8 is provided to cover the opening for removably receiving and engaging the air cooling assembly 30. The bottom has an opening 9 for engaging the primary air blower fan 40. The top has an opening 11 for engaging the secondary air blower fan 45. The insulated portable casing is adapted to house a plurality of sizes and shapes of the air cooling assembly 30. The box-shaped insulated portable casing 93 has an upper extent 48 removably receiving and engaging an air outlet duct 47. The air outlet duct 47 is movable and extendable in a vertical orientation and is rotatable around a horizontal axis at an upper extent 48 of the box-shaped insulated portable casing 93. In this manner, upon the manipulation of the air outlet duct 47 a user of the system is provided with an air flow in a specific user-selected direction. An auxiliary variable blower fan 46 is provided at a top opening of the air outlet duct 47 providing for increasing and decreasing the volume of air flow. Lateral openings 86 provide for intake of air into the insulated portable casing.

The air cooling assembly comprises at least one refrigerant pack and container of at least one refrigerants ingredient in a plurality of shapes and sizes including rectangular (31)(32)(33) and cylindrical shaped refrigerant packs, and containers. The refrigerant materials and ingredients are chosen from a class of materials including liquids, gel, solid, metal, and compounds for retaining cold temperature for extended periods of time. The refrigerant packs further include in combination a plurality of shapes and sizes of portable sacks and containers (31)(32)(33) having refrigerant ingredients including ingredients in liquid and gel states. A refrigerant positioning component (75) secures and positions the plurality of refrigerant packs and containers 31, 32, 33 in a plurality of configurations and patterns providing spaces and channels in between the refrigerant and refrigerant containers. In this manner, paths are provided for air to flow and circulate in between the refrigerants. The temperature of the refrigerant packs and containers is adapted to be lowered generally by cooling the refrigerant in a freezer. The air cooling assembly is adapted to be inserted and removably positionable within the central opening 79 of the insulated portable casing. In this manner, circulation and flow of warm external air through the refrigerants of the air cooling assembly is facilitated.

The computer control unit 50 has at least a processor and programmer operably coupled with the switches. The computer control unit also has a plurality of temperature sensors 81, 82 and the primary air blower fan and the secondary air blower fan. The processor and programmer optimize the efficiency of the operational functions of the air cooling system and further regulate speed of the primary air blower fan and the secondary air blower fan. The temperature sensors provide the processor and programmer with the external air temperature. The processor and programmer of the computer control unit provide regulation of the speed of the blower fans and further provide optimization of the efficiency of cooling functions of the portable air cooling system. Switches and variable resistance switches 84 provide the manual selection and operation of the blower fans including increasing and decreasing of the speeds of the blower fan. The primary air blower fan 40 is coupled to the bottom of the insulated portable casing.

The primary air blower fan is adapted to generally provide the circulation of external air within and between the refrigerant packs and containers components of the air cooling assembly thus providing cooling of the external air.

The secondary air blower fan 45 is coupled to the top of the insulated portable casing. The secondary air blower fan primarily provides and directs a flow of air output and further provides circulation of air between the refrigerant components of the air cooling assembly. The secondary air blower fan further directs the air that is cooled within the insulated portable casing to a user-selected direction. In this manner, the cooled air is directed to flow to the user-selected and preferred area. The air outlet duct 47 is telescoping and configured to extend upward and retract back downward in a vertical orientation and to rotate in a horizontal orientation further providing controlling of the direction of air flow. A vent is provided. The vent has a variable aperture 83 for providing a mixture of chilled output air from the system with warm external air having an air temperature of the immediate surrounding and geographical location where the portable air cooling system is located. In this manner, a specific ratio of warm and chilled air mixture is provided. An opening 80 has an insulated door 8 on a side of the insulated portable casing for the removal of the depleted air cooling assembly from the insulated portable casing and for receiving the refrigerated chilled air cooling assembly 30 to allow for replacing and replenishing of the air cooling assembly.

The portable power source includes rechargeable batteries and solar cells and solar panels 70. The bottom of the insulated portable casing 93 removably couples a secondary casing (65). The secondary casing generally provides a housing for the power source including the rechargeable batteries.

The system provides a supply of cold air to a user. Cooling of the external warm air is by circulating the external air through the refrigerated cold refrigerant components of the air cooling assembly that is positioned within the central opening of the insulated portable casing. The conduction and convection transfers the cold temperature from the refrigerant to the warm circulating external air. Blower fans direct and blow cooled air in a user selected direction and zone. Expended air cooling assembly is replaced when appropriate with cold refrigerated active replacement refrigerant packs and containers. In this manner, cooling and continued cooling of the external air is facilitated.

The present invention includes a method use of the portable air cooling system for providing portable air cooling generally for mobile use. The method includes the following stemps in combination.

The first step is providing a box-shaped insulated portable casing 93, an air cooling assembly 30, a primary air blower fan 40, a secondary air blower fan 45, a computer control unit 50, switches 60 including variable resistance switches, and a portable power source including batteries and solar panels 70.

The next step is providing a secondary casing 65 for housing the portable power source including batteries.

The box-shaped insulated portable casing 93 generally has insulated left 2, right 3, front 4 and back 5 upstanding sides and a top 6 and a bottom 7, a central opening 79 between the left 2, the right 3, the front 4, and the back 5 upstanding sides and the top 6 and the bottom 7, the front side having an opening 80 with an insulated door 8 for removably receiving and engaging the air cooling assembly 30, the bottom section having an opening 9 for engaging the primary air blower fan 40, the top having an opening 11 for engaging the secondary air blower fan 45, the insulated portable casing adapted to house a plurality of sizes and shapes of the air cooling assembly 30.

The box-shaped insulated portable casing 93 having an upper extent 48 removably receiving and engaging air outlet duct 47, the air outlet duct 47 being movable and extendable in a vertical orientation and rotatable around a horizontal axis at the upper extent 48 of the box-shaped insulated portable casing 93 thus upon the manipulation of the air outlet duct 47 by a user of the system there is provided an air flow in a specific user-selected direction, an auxiliary variable blower fan 46 at a top opening of the air outlet duct 47 for increasing and decreasing the volume of air flow.

The next step is providing lateral openings 86 for intake of air into the insulated portable casing, wherein the air cooling assembly comprises at least one refrigerant pack and container and further includes a plurality of combinations of a plurality of shapes and sizes including rectangular 31, 32, 33 and cylindrical shaped refrigerant ice packs, gel packs, and containers comprising refrigerant materials chosen from a class of materials including liquids, solid, metal, and compounds for retaining cold temperature for extended periods of time, the refrigerant packs further including in combination a plurality of shapes and sizes of portable sacks and containers 31, 32, 33 filled with refrigerant including liquid and gel, a refrigerant positioning component 75 securing and positioning the plurality of refrigerant packs 31, 32, 33 in a plurality of configurations and patterns providing spaces and channels in between the refrigerant packs and containers thus providing paths for air to flow and circulate in between the refrigerant packs, the temperature of the refrigerant packs and containers adapted to be lowered by generally cooling the refrigerant packs in a freezer and the refrigerant packs being removably inserted into a central opening 79 of the insulated portable casing for providing cooling of the air circulating within the insulated portable casing.

The computer control unit 50 has at least a processor and programmer operably coupled with the switches, a plurality of temperature sensors 81, 82 and the primary air blower fan and the secondary air blower fan, the processor and programmer optimizing the efficiency of the operational functions of the air cooling system and further regulating speed of the primary air blower fan and the secondary air blower fan, the temperature sensors providing the processor and programmer the external air temperature, the computer control unit regulating the speed of the blower fans and thus providing optimization of the efficiency of cooling functions of the air cooling system through variable resistance switches 84 allowing the user to select the speeds of the blower fan, the primary air blower fan 40.

The next step is coupling the bottom of the insulated portable casing, the primary air blower fan providing the circulation of external air in between the refrigerant packs of the air cooling assembly positioned within the central opening 79 of the insulated portable casing thus providing cooling of the external air.

The next step is coupling the secondary air blower fan 45 to the top of the insulated portable casing, the secondary air blower fan primarily providing and directing a flow of air output and further providing circulation of air between the air cooling assembly, the secondary air blower fan directing the air that is cooled within the insulated portable casing to a user-selected direction, thus providing the user of the system a flow of cooled air to the user-selected and preferred area, the air outlet duct 47 configured for telescoping, further providing a controlled directional air flow, a vent with a variable aperture 83 for providing for a mixture of chilled output air from the system with warm external air having an air temperature of the immediate environment and geographical location where the portable air cooling system is located, thus providing a specific ratio of warm and chilled air mixture.

The next step is removing depleted air from the cooling assembly and receiving the refrigerated active air from the cooling assembly 30 through the opening 80 with the insulated door 8 on a side of the insulated portable casing.

The portable power source includes rechargeable batteries and solar cells and solar panels 70, the bottom of the insulated portable casing 93 removably coupling with the secondary casing 65, the secondary casing generally providing a housing for the power source including the rechargeable batteries.

The next step is cooling external warm air by circulating the warm external air through the air cooling assembly positioned within the central opening of the insulated portable casing.

The next step is directing the cooled air in the user-selected and preferred direction and providing replacing of the expended air cooling assembly with replacement active refrigerated refrigerant packs and containers for continuing of the cooling function.

The box shaped insulated portable casing generally has insulated left, right, front and back upstanding sides and a top and a bottom, a central opening between the left, the right, the front and the back upstanding sides and the top and the bottom, the front having an opening with an insulated door for removably receiving the air cooling assembly, the bottom section having an opening engaging the primary air blower fan unit the top having an opening engaging the secondary air blower fan unit, the size and capacity insulated portable casing adapted to be varied, increased and reduced to house plurality of sizes and shapes of the air cooling assembly 30.

The design, configuration, selection, number, and arrangements of the refrigerant components of the portable air cooling system are adapted to be modified for varying requirements and the manner of use including a plurality of external temperature conditions and preferences of the user of the system and the manner of use including the location and placement of the portable air cooling system where the portable air cooling system is positioned for use in a golf cart or similar vehicle.

The next step is providing the system with at least one blower fan wherein the at least one blower fan provides circulation of external air within and between the refrigerant packs and further directs the air flow in the user designated direction.

The next step is providing the system with a plurality of blower fans wherein the plurality of blower fans each blower fan providing circulation of external air within and between the refrigerant packs and further directing the air flow in the user designated direction.

The next step is providing the refrigerants in a selection of and in a plurality of forms including gel, gas, solid, metal, compounds, liquids, and combinations of a plurality of refrigerant materials and ingredients and in a plurality of sizes, shapes, materials and containers to choose from, and further each refrigerant pack and container of the air cooling assembly having plurality of refrigerant materials each refrigerant having a specific refrigerated temperatures.

The next step is providing the portable air cooling system with at least a preliminary air intake cooling section positioned within the insulated portable casing 93 comprising a passage for air flow wherein the external air upon entering the preliminary air intake cooling section is initially cooled thus initially lowering the external air temperature.

The next step is removably inserting the generally cylindrical secondary casing 65 coupling there within remote items and objects associated with the portable air cooling system 10, the remote objects including a cup holder of a golf cart to secure the remote item to the portable air cooling system 10.

The final step is providing the refrigerant pack and containers of the air cooling assembly in a plurality of combinations of ingredients, each having a plurality of ingredients and plurality of combinations of ingredients.

The external temperature can drastically vary depending upon the geographical region and the seasons of the year. The users of this system will have varying preferences. It is understood it is within the scope of this invention to include such variations. The design and arrangements and the numbers of the components of the portable air cooling system are adapted to optimize the function of this system to include the plurality of external temperature conditions and preferences of users of the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is as follows:

1. A portable air cooling system (10) for providing cooled air generally for mobile use for a user including in golf carts, the system comprising in combination:
   an insulated portable casing (93);
   an air cooling assembly (30);
   a primary air blower fan (40);
   a secondary air blower fan (45);
   a computer control unit (50);
   switches (60) including variable resistance switches;
   a portable power source including batteries and solar panels (70); and
   a secondary casing (65) for housing the portable power source including batteries.

2. The portable air cooling system (10) as set forth in claim 1 wherein:
   the insulated portable casing is a box-shaped insulated portable casing (93) generally having insulated left (2), right (3), front (4), and back (5) upstanding sides and a top (6) and a bottom (7), a central opening (79) between the left (2), the right (3), the front (4), and the back (5) upstanding sides and the top (6) and the bottom (7), the front side having an opening (80) with an insulated door (8) for removably receiving and engaging the air cooling assembly (30), the bottom having an opening (9) for engaging the primary air blower fan (40), the top having an opening (11) for engaging the secondary air blower fan (45), the insulated portable casing adapted to house a plurality of sizes and shapes of the air cooling assembly (30), the box-shaped insulated portable casing (93) having an upper extent (48) removably receiving and engaging an air outlet duct (47), the air outlet duct (47) being movable and extendable in a vertical orientation and rotatable around a horizontal axis at an upper extent (48) of the box-shaped insulated portable casing (93) thus upon the manipulation of the air outlet duct (47) a user of the system is provided an air flow in a specific user-selected direction, an auxiliary variable blower fan (46) at a top opening of the air outlet duct (47) providing for increasing and decreasing the volume of air flow, lateral openings (86) for providing intake of air into the insulated portable casing;

the air cooling assembly comprises at least one refrigerant pack and container of at least one refrigerants ingredient in a plurality of shapes and sizes including rectangular (31)(32)(33) and cylindrical shaped refrigerant packs, and containers, the refrigerant materials and ingredients chosen from a class of materials including liquids, gel, solid, metal, and compounds for retaining cold temperature for extended periods of time, the refrigerant packs further including in combination a plurality of shapes and sizes of portable sacks and containers (31)(32)(33) having refrigerant ingredients including ingredients in liquid and gel states, a refrigerant positioning component (75) securing and positioning the plurality of refrigerant packs and containers (31)(32)(33) in a plurality of configurations and patterns providing spaces and channels in between the refrigerant and refrigerant containers thus providing paths for air to flow and circulate in between the refrigerants, the temperature of the refrigerant packs and containers adapted to be lowered generally by cooling the refrigerant in a freezer, the air cooling assembly adapted to be inserted and removably positionable within the central opening (79) of the insulated portable casing, providing circulation and flow of warm external air through the refrigerants of the air cooling assembly;

the computer control unit (50) has at least a processor and programmer operably coupled with the switches, a plurality of temperature sensors (81)(82) and the primary air blower fan and the secondary air blower fan, the processor and programmer optimizing the efficiency of the operational functions of the air cooling system and further regulating speed of the primary air blower fan and the secondary air blower fan, the temperature sensors providing the processor and programmer the external air temperature, the processor and programmer of the computer control unit providing regulation of the speed of the blower fans and further providing optimization of the efficiency of cooling functions of the portable air cooling system, switches and variable resistance switches (84) providing the manual selection and operation of the blower fans including increasing and decreasing of the speeds of the blower fan, the primary air blower fan (40) coupled to the bottom of the insulated portable casing;

the primary air blower fan is adapted to generally provide the circulation of external air within and between the refrigerant packs and containers components of the air cooling assembly thus providing cooling of the external air;

the secondary air blower fan (45) is coupled to the top of the insulated portable casing, the secondary air blower fan primarily providing and directing a flow of air output and further providing circulation of air between the refrigerant components of the air cooling assembly, the secondary air blower fan further directing the air that is cooled within the insulated portable casing to a user-selected direction, thus directing the cooled air to flow to the user-selected and preferred area, the air outlet duct (47) being telescoping and configured for extending upward and retracting back downwards in a vertical orientation and rotating in a horizontal orientation further providing a controlling of the direction of air flow, a vent with a variable aperture (83) for providing for a mixture of chilled output air from the system with warm external air having an air temperature of the immediate surrounding and geographical location where the portable air cooling system is located, thus providing a specific ratio of warm and chilled air mixture, an opening (80) having an insulated door (8) on a side of the insulated portable casing for the removal of the depleted air cooling assembly from the insulated portable casing and further receiving refrigerated chilled air cooling assembly (30) to allow for replacing and replenishing of the air cooling assembly;

the portable power source includes rechargeable batteries and solar cells and solar panels (70), the bottom of the insulated portable casing (93) removably coupling a secondary casing (65), the secondary casing generally providing a housing for the power source including the rechargeable batteries;

the system provides a user a supply of cold air, cooling of the external warm air by circulating the external air through the refrigerated cold refrigerant components of the air cooling assembly that is positioned within the central opening of the insulated portable casing, the conduction and convection transferring the cold temperature from the refrigerant to the warm circulating external air and blower fans directing and blowing cooled air in a user selected direction and zone and further providing replacing of the expended air cooling assembly with cold refrigerated active replacement refrigerant packs and containers, thus providing cooling and continued cooling of the external air.

3. The system as set forth in claim 2 wherein the design, configuration, selection, number, and arrangements of the refrigerant components of the portable air cooling system are adapted to be modified for varying requirements and the manner of use including a plurality of external temperature conditions and preferences of the user of the system and the manner of use including the location and placement of the portable air cooling system where the portable air cooling system is positioned for use in a golf cart.

4. The system as set forth in claim 2 wherein the system includes at least one blower fan providing circulation of external air within and between the refrigerant packs and further directing the air flow in the user designated direction.

5. The system as set forth in claim 2 wherein the system includes a plurality of blower fans, each blower fan providing circulation of external air within and between the refrigerant packs and further directing the air flow in the user designated direction.

6. The system as set forth in claim 2 wherein the refrigerants are in a selection of a plurality of forms including gel, gas, solid, metal, compounds, liquids, and combinations of a plurality of refrigerant materials and ingredients and in a plurality of sizes, shapes, materials and containers to choose from, each refrigerant pack and container of the air cooling assembly having a plurality of refrigerant materials, each refrigerant having specific refrigerated temperatures.

7. The system set forth in claim 2 wherein the portable air cooling system further includes:
at least one preliminary air intake cooling section positioned within the insulated portable casing (93) comprising a passage for air flow wherein the external air upon entering the preliminary air intake cooling section is initially cooled thus initially lowering the external air temperature.

8. The system set forth in claim 2 wherein the generally cylindrical secondary casing (65) is removably inserted coupling within remote items and objects associated with the portable air cooling system (10) including a cup holder of a golf cart thus providing securing of the portable air cooling system (10) to the remote item.

9. The system as set forth in claim 2 wherein the refrigerant pack and containers of the air cooling assembly are a plurality of combinations of ingredients.

10. The system as set forth in claim 2 wherein the plurality of refrigerant pack and containers of the air cooling assembly each has a plurality of ingredients and a plurality of combinations of ingredients.

\* \* \* \* \*